US010933845B2

(12) United States Patent
Alexander

(10) Patent No.: US 10,933,845 B2
(45) Date of Patent: Mar. 2, 2021

(54) APPARATUS FOR ENHANCING VEHICLE PERFORMANCE ALONG INCLINED SURFACES, AND METHODS OF USE AND MANUFACTURE THEREOF

(71) Applicant: Honda Motor Co., Ltd., Tokyo (JP)

(72) Inventor: Matthew J. Alexander, Hilliard, OH (US)

(73) Assignee: HONDA MOTOR CO., LTD., Tokyo (JP)

(*) Notice: Subject to any disclaimer, the term of this patent is extended or adjusted under 35 U.S.C. 154(b) by 143 days.

(21) Appl. No.: 15/085,785

(22) Filed: Mar. 30, 2016

(65) Prior Publication Data
US 2017/0282874 A1    Oct. 5, 2017

(51) Int. Cl.
*B60T 8/24* (2006.01)
*B60T 7/04* (2006.01)
*B60T 7/08* (2006.01)
*B60T 7/12* (2006.01)

(52) U.S. Cl.
CPC .......... *B60T 7/042* (2013.01); *B60T 7/085* (2013.01); *B60T 7/122* (2013.01); *B60T 2201/06* (2013.01); *B60T 2210/16* (2013.01)

(58) Field of Classification Search
CPC ...... B60T 8/245; B60T 7/042; B60T 2201/06; B60T 2210/16
USPC ................................................. 303/191, 192
See application file for complete search history.

(56) References Cited

U.S. PATENT DOCUMENTS

| | | | |
|---|---|---|---|
| 3,937,525 A * | 2/1976 | Luhdorff | B60T 8/17613 303/168 |
| 5,249,850 A * | 10/1993 | Kampfmann | B60T 8/173 303/165 |
| 6,328,018 B1 * | 12/2001 | Akasaka | F02D 11/106 123/487 |
| 6,513,882 B1 * | 2/2003 | Schneider | B60L 7/26 303/112 |
| 7,226,389 B2 | 6/2007 | Steen et al. | |
| 7,711,469 B2 | 5/2010 | Sokoll et al. | |
| 7,762,633 B2 | 7/2010 | Maskell et al. | |
| 7,934,589 B2 | 5/2011 | Groner et al. | |
| 7,980,638 B2 | 7/2011 | Matsuzaki et al. | |
| 8,078,378 B2 | 12/2011 | Bradley, IV | |
| 8,224,548 B2 | 7/2012 | Ludwig et al. | |
| 8,412,436 B2 | 4/2013 | Mallet et al. | |

(Continued)

FOREIGN PATENT DOCUMENTS

KR     20130138013 A    12/2013
WO     2014179281 A2    11/2014

*Primary Examiner* — Melody M Burch
(74) *Attorney, Agent, or Firm* — Kenealy Vaidya LLP

(57) ABSTRACT

Some embodiments relate to apparatus for enhancing vehicle performance along an inclined surface. The apparatus can include a brake modulator that is controllable to reduce or limit the vehicle speed. A controller can control the brake modulator to selectively operate in a hill start assist mode. In the hill start assist mode, the controller can control the brake modulator to hold the vehicle stationary after the vehicle is initially stopped while traveling along the inclined surface, until an acceleration input member is manually operated to control a power source to propel the vehicle. The controller can control the brake modulator to release fluid pressure at the friction members at a pressure release rate that is based on a current position of the acceleration input member.

16 Claims, 3 Drawing Sheets

(56) References Cited

U.S. PATENT DOCUMENTS

| | | |
|---|---|---|
| 8,565,994 B2 | 10/2013 | Mallet |
| 8,589,046 B2 | 11/2013 | Pothin et al. |
| 8,649,948 B2 | 2/2014 | Yanagida et al. |
| 8,989,977 B1 | 3/2015 | Li et al. |
| 9,045,119 B2 | 6/2015 | Burkert et al. |
| 9,120,470 B2 | 9/2015 | Harada |
| 9,126,597 B2 | 9/2015 | Yu et al. |
| 9,132,819 B2 | 9/2015 | Furuyama |
| 9,193,338 B2 | 11/2015 | Schaefers et al. |
| 2008/0097234 A1* | 4/2008 | Nicolazzi ............... A61B 5/087 600/538 |
| 2013/0024058 A1 | 1/2013 | Han |
| 2013/0235204 A1* | 9/2013 | Buschmann ............. H04N 7/18 348/148 |
| 2013/0255650 A1* | 10/2013 | Kim ................... F02M 25/0753 123/568.21 |
| 2014/0012477 A1 | 1/2014 | Lu et al. |
| 2015/0217740 A1 | 8/2015 | Hecker et al. |
| 2015/0224968 A1 | 8/2015 | Kim |

\* cited by examiner

000
APPARATUS FOR ENHANCING VEHICLE PERFORMANCE ALONG INCLINED SURFACES, AND METHODS OF USE AND MANUFACTURE THEREOF

BACKGROUND

The disclosed subject matter relates to apparatus for enhancing vehicular performance along inclined surfaces, and methods of use and manufacture thereof. More particularly, the disclosed subject matter relates to methods and apparatus that control the transition from a stationary condition to a traveling condition as the vehicle travels along an inclined surface.

A self-propelled vehicle can be configured to travel along: 1) an improved path (such as paths paved with a durable surface material, e.g., asphalt, concrete, stone, brick, etc.), 2) an unimproved path (such as a dirt path), and/or 3) any unmarked path of travel (such as along a wooded area, open field, rocky area, water feature, etc.). "Off-road vehicles" can be specially configured to enhance performance while traveling along an unimproved or unmarked path of travel. This specialized configuration can include increased suspension travel, increased ground clearance, and/or enhanced durability, as compared to vehicles configured for travel along an improved path.

SUMMARY

Although inclines exist in all types of paths, they can be especially challenging, from the perspective of vehicle performance, along unimproved or unmarked paths of travel. For example, the uneven surfaces and differences in grades prevalent in unimproved or unmarked paths of travel may be particularly pronounced and difficult for operators of off-road vehicles to navigate.

As one example, vehicle operational challenges arise subsequent to stopping a vehicle that is traveling up an inclined surface. In particular, the vehicle has a tendency to roll backwards down the inclined surface as the operator transitions from applying a braking input to an acceleration input. Compensating for this downward motion can cause the operator to stall the engine, or to accelerate the vehicle in an unintended or undesirable manner. Compensation for this downward motion may also result in a rough ride for vehicle passengers.

It may therefore be beneficial to provide methods and apparatus for addressing the above and/or other operational challenges of related art vehicles. In particular, it may be beneficial to enhance vehicle operation during the transition from braking input to acceleration input for vehicles stopped while traveling along an inclined surface, which travel can be up or down the inclined surface.

Some embodiments are therefore directed to a brake control system for enhancing performance of a vehicle traveling along an inclined surface. The vehicle can include a vehicle braking system that includes friction members for reducing or limiting vehicle speed based on application of fluid pressure, the vehicle also including a power source assembly and a manually operated acceleration input member that controls the power source assembly to propel the vehicle along the inclined surface. The brake control system can include a manually actuated braking input member, a brake modulator, and a controller. The manually actuated braking input member can be movable between an actuated position that reduces or limits vehicle speed and a released position that does not reduce or limit vehicle speed. The brake modulator can be controllable to manipulate the vehicle braking system to maintain the vehicle in a stationary position by maintaining an amount of fluid pressure supplied to the friction members if the braking input member is in the released position. The controller can control the brake modulator to selectively operate in a hill start assist mode such that the controller controls the brake modulator to adjust fluid pressure at the friction members to hold the vehicle stationary after the vehicle is initially stopped while traveling along the inclined surface. The vehicle can be held stationary until the acceleration input member is manually operated to control the power source assembly to propel the vehicle. The controller can control the brake modulator to release fluid pressure at the friction members at a pressure release rate that is based on a current position of the acceleration input member.

Some other embodiments are directed to a vehicle that can include a power source assembly, a manually operated acceleration input member, a vehicle braking system, and a brake control system for enhancing performance of a vehicle traveling along an inclined surface. The manually operated acceleration input member can control the power source assembly to propel the vehicle along the inclined surface. The vehicle braking system can include friction members for reducing or limiting vehicle speed based on application of fluid pressure. The brake control system can include a manually actuated braking input member, a brake modulator, and a controller. The braking input member can be movable between an actuated position that reduces or limits vehicle speed and a released position that does not reduce or limit vehicle speed. The brake modulator can be controllable to manipulate the vehicle braking system to maintain the vehicle in a stationary position by maintaining an amount of fluid pressure supplied to the friction members if the braking input member is in the released position. The controller can control the brake modulator to selectively operate in a hill start assist mode such that the controller can control the brake modulator to adjust fluid pressure at the friction members to hold the vehicle stationary after the vehicle is initially stopped while traveling along the inclined surface. The vehicle can be held stationary until the acceleration input member is manually operated to control the power source to propel the vehicle. The controller can control the brake modulator to release fluid pressure at the friction members at a pressure release rate that is based on a current position of the acceleration input member.

Still other embodiments are directed to a method of enhancing performance of a vehicle traveling along an inclined surface. The vehicle can include a vehicle braking system, a brake modulator, a manually actuated braking input member, and a power source assembly. The braking system can includes friction members for reducing or limiting vehicle speed based on application of fluid pressure. The brake modulator can be controllable to manipulate the vehicle braking system to reduce or limit the vehicle speed by controlling an amount of fluid pressure supplied to the friction members. The braking input member can be movable between an actuated position that reduces or limits vehicle speed and a released position that does not reduce or limit vehicle speed. The acceleration input member can control the power source assembly to propel the vehicle along the inclined surface. The method can include: detecting the released position of the braking input member; selectively instructing activation and deactivation of a hill start assist system mode; and controlling the brake modulator to manipulate the vehicle braking system to selectively operate in a hill start assist mode such that the brake modulator adjusts fluid pressure at the friction members to hold the vehicle stationary after the vehicle is initially stopped while traveling along the inclined surface, the vehicle being held stationary until the acceleration input member is manually operated to control the power source assembly to propel the vehicle, and the controller controls the brake modulator to release fluid pressure at the friction members at a pressure release rate that is based on a current position of the acceleration input member.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

I. Overview of Vehicle

Figure 1:
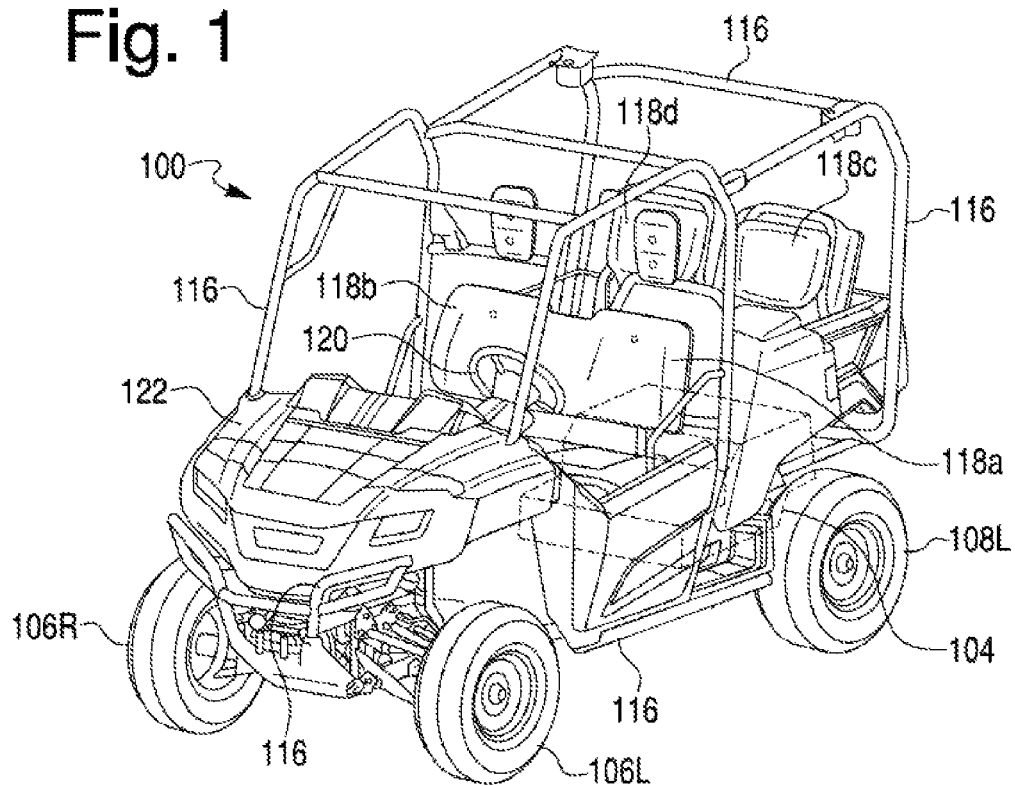
FIG. 1 is a perspective view of an exemplary vehicle in accordance with the disclosed subject matter.

FIG. 1 is a perspective view of an exemplary vehicle 100 in accordance with the disclosed subject matter. The exemplary vehicle 100 of FIG. 1 is configured for travel along any one or combination of improved, unimproved, and unmarked paths. The vehicle 100 can be specialized for use on an unimproved path or on an unmarked path, and referred to as a multipurpose utility vehicle (MUV) or as a side-by-side all-terrain vehicle (SxS, or SxS ATV).

Figure 2:
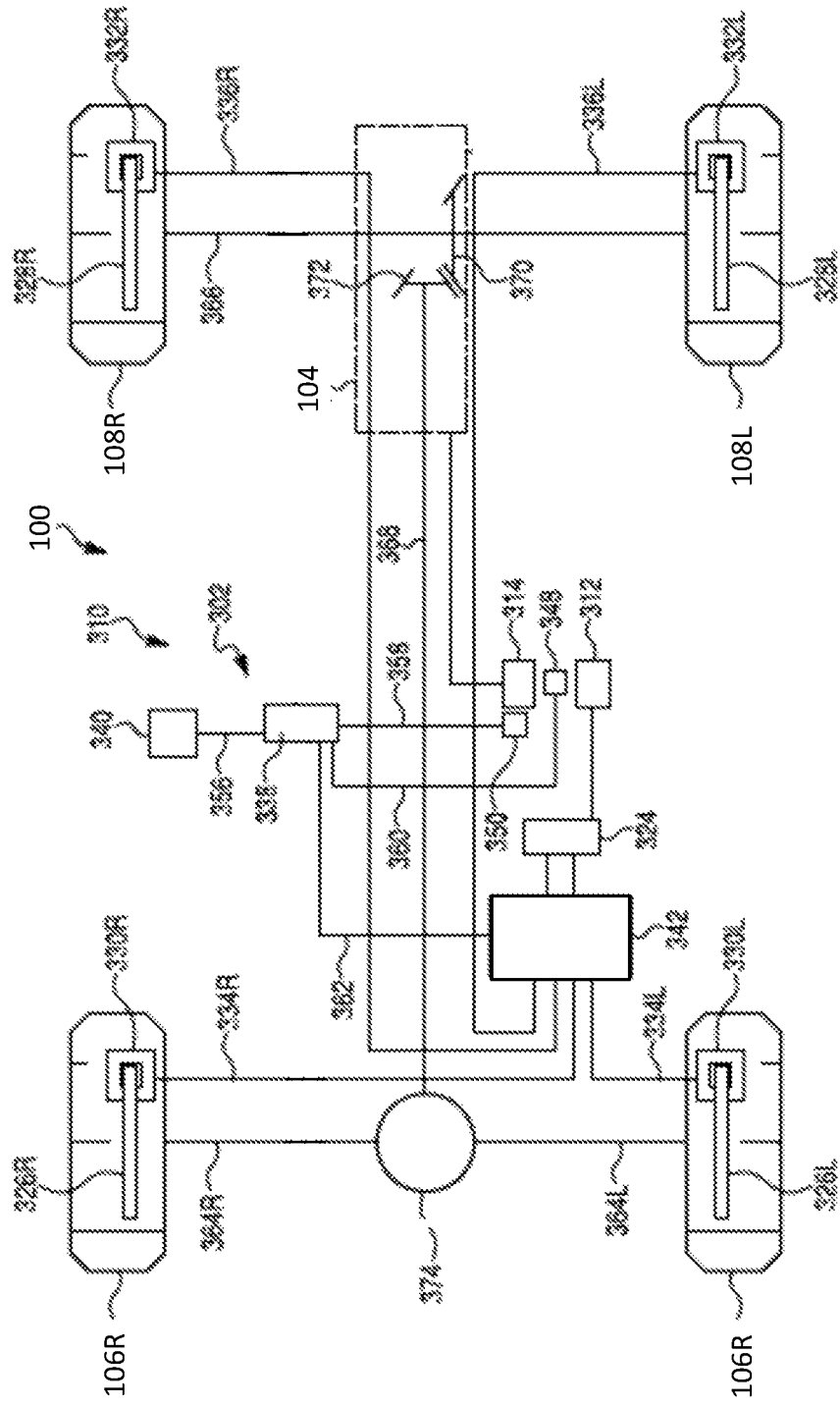
FIG. 2 is a schematic view of the vehicle of FIG. 1 having an exemplary drivetrain configuration in accordance with the disclosed subject matter.

The vehicle 100 can include a power source assembly 104, a pair of front wheels 106L, 106R, a pair of rear wheels 108L, 180R (the right rear wheel 108R is obstructed from view in FIG. 1—see FIG. 2), a vehicle braking system, a braking input member, an acceleration input member, and a brake control system. The power source assembly 104 is shown schematically in FIG. 1 via phantom lines. The vehicle braking system, the braking input member and the acceleration input member are omitted from FIG. 1 for clarity of the drawing figure, but are schematically represented in FIG. 2. The vehicle braking system, braking input member, acceleration input member, and brake control system will be described in further detail with reference to FIGS. 2-5.

In accordance with various of the disclosed embodiments, and as will be further explained below with reference to FIGS. 2-5, the brake control system can be configured to modulate the vehicle braking system if the vehicle is traveling downward along an inclined surface in a forward direction or in a rearward direction. For example, the brake control system can be configured to actuate the vehicle braking system under certain circumstances where the vehicle is stopped on an uphill slope, even though the operator is not applying an input to the brake input member.

The vehicle 100 can include a frame assembly 116, a plurality of seats 118a, 118b, 118c, 118d, a steering input member 120, and a body panel 122. The seats 118a, 118b, 118c, 118d, the steering input member 120, the body panel 122, the power source assembly 104, and the wheels 106L, 106R, 108L, 108R can be directly or indirectly mounted to the frame assembly 116 in any appropriate manner. The power source assembly 104 can be coupled to at least one of the wheels 106L, 106R, 108L, 108R in any appropriate manner to propel the vehicle 100. In an exemplary embodiment, the power source assembly 104 can be directly or indirectly coupled to at least the pair of rear wheels 108L, 108R. The vehicle 100 can include one body panel 122 or a plurality of body panels directly or indirectly secured to the frame assembly 116.

The braking input member can be in communication with the vehicle braking system and the brake control system. In an exemplary embodiment, the braking input member can be configured as a pedal movably mounted relative to the frame assembly 116, and adjacent to the left front seat 118a. For example, the pedal can be disposed above the floor of the vehicle 100 to be manually movable by the vehicle operator's foot to effectuate the braking operation.

The vehicle braking system can be in communication with the brake control system. The vehicle braking system can be configured to slow or stop movement of the vehicle 100 in response to an input applied by the vehicle operator to the braking input member. The vehicle braking system can include at least one first friction member mounted to rotate with a corresponding one of the wheels 106L, 106R, 108L, 108R, and at least one second friction member movable into and out of engagement with the at least one first friction member. The at least one second friction member can be in communication with the braking input member, such as via a wire cable, fluid in a conduit, etc. In an exemplary embodiment, the vehicle braking system can include four disc rotors (one for each wheel), four brake calipers (one for each wheel), and a hydraulic fluid circuit in communication with a brake pedal and each of the four calipers.

The acceleration input member can be in communication with the power source assembly 104 and the brake control system. In an exemplary embodiment, the acceleration input member can be configured as a pedal movably mounted to the frame assembly 116 and adjacent to the left front seat 118a. For example, the pedal can be disposed above the floor of the vehicle 100 to be manually movable by the vehicle operator's foot to effectuate acceleration. Specifically, the acceleration input member can transmit an input from the vehicle operator to the power source assembly 104 in order to regulate the drive output of the power source assembly 104, which can be applied to the at least one of the wheels 106L, 106R, 108L, 108R.

At least a portion of the power source assembly 104 can be located underneath at least one of the seats 118a, 118b, 118c, 118d. In some of these exemplary embodiments, at least a portion of the power source assembly 104 is located underneath the rear row of seats 118c, 118d.

The steering input member 120 can be coupled to the pair of front wheels 106L, 106R in any appropriate manner. The front pair of wheels 106L, 106R can be directly or indirectly connected to the frame assembly 116 in any appropriate manner that permits the front pair of wheels 106L, 106R to pivot about a substantially vertical axis in response to the operator's input to the steering input member 120 for the purpose of manually steering the vehicle 100 for travel along an intended path. In an exemplary embodiment, the steering input member 120 can be configured as a manually rotatable wheel.

II. Exemplary Drivetrain and Brake Control System

FIG. 2 is a schematic view of the vehicle 100 of FIG. 1 having an exemplary drivetrain configuration in accordance with the disclosed subject matter. The vehicle 100 can include a brake control system 302 made in accordance with the principles of the disclosed subject matter. The brake control system 302 is schematically represented in FIG. 2. The vehicle 100 can include a braking input member 312, and an acceleration input member 314. The power source assembly 104 is shown schematically in phantom lines in FIG. 2.

In accordance with various of the disclosed embodiments, and as will be further explained below with reference to FIGS. 2-5, the brake control system 302 can be configured to modulate the vehicle braking system 310 if the vehicle is stopped on an inclined surface such as an uphill slope. For example, the brake control system 302 can be configured to actuate the vehicle braking system 310 under certain circumstances where the vehicle is stopped on an inclined with the vehicle facing up the inclined surface or down the inclined surface, even though the operator is not applying an input to the braking input member 312.

The braking input member 312 can be in communication with the vehicle braking system 310 and the brake control system 302. In an exemplary embodiment, the braking input member 312 can be configured as a movable pedal.

The vehicle braking system 310 can be in communication with the brake control system 302. The vehicle braking system 310 can be configured to slow or stop traveling motion of the vehicle 100 in response to an input applied by an operator of the vehicle 100 to the braking input member 312.

The vehicle braking system 310 can include a master cylinder 324, a plurality of first friction members 326L, 326R, 328L, 328R, a plurality of second friction members 330L, 330R, 332L, 332R, and a plurality of communication lines 334L, 334R, 336L, 336R. The vehicle braking system 310 can include additional components, such as but not limited to a proportional control valve, fluid reservoir, etc.

The master cylinder 324 can be in communication with the braking input member 312. The braking input member 312 can transmit an input from the operator to at least one of the second friction members 330L, 330R, 332L, 332R via the master cylinder 324. This communication can be performed using various technologies, such as mechanical, electro-mechanical, or electrical technologies. The master cylinder 324 can be in communication with the second friction members 330L, 330R, 332L, 332R via the communication lines 334L, 334R, 336L, 336R. This communication can be fluid communication via a hydraulic fluid or a pneumatic fluid. The communication lines 334L, 334R, 336L, 336R can be configured as fluid conduits. The master cylinder 324 can be configured to convert displacement of the braking input member 312 into a corresponding fluid pressure in the communication lines 334L, 334R, 336L, 336R.

Each of the first friction members 326L, 326R, 328L, 328R can be mounted to rotate with a respective one of the wheels 106L, 106R, 108L, 108R. The plurality of second friction members 330L, 330R, 332L, 332R can be fixed relative to the frame 116 of the vehicle 100. The plurality of second friction members 330L, 330R, 332L, 332R can be movable into and out of engagement with the respective one of the first friction members 326L, 326R, 328L, 328R. Each of the second friction members 330L, 330R, 332L, 332R can be in communication with the braking input member 312 via the respective one of the communication lines 334L, 334R, 336L, 336R. In an exemplary embodiment, the first friction members 326L, 326R, 328L, 328R can be configured as disc rotors, and the second friction members 330L, 330R, 332L, 332R can be configured as brake calipers. Each caliper can include at least one piston, and at least one brake pad that can be moved into and out of engagement with a respective one of the first friction members 326L, 326R, 328L, 328R based on the fluid pressure transmitted by the master cylinder 324 to the piston of each of the second friction members 330L, 330R, 332L, 332R via the communication lines 334L, 334R, 336L, 336R.

The braking input member 312 can be moved between a released position and a plurality of actuated positions. In the released position, the braking input member 312 can cause the master cylinder 324 to transmit a fluid pressure to the second friction members 330L, 330R, 332L, 332R, or to release the fluid pressure in the master cylinder 324 such that second friction members 330L, 330R, 332L, 332R remain disengaged from, or are moved out of engagement with, the first friction members 326L, 326R, 328L, 328R, respectively. In any of the actuated positions, the fluid pressure in the master cylinder 324 increases such that the second friction members 330L, 330R, 332L, 332R engage the first friction members 326L, 326R, 328L, 328R. The fluid pressure in the master cylinder 324 can be proportional to the amount of displacement of the braking input member 312.

The brake control system 302 can include a controller 338, switch 340, brake modulator 342, plurality of position sensors 348, 350, and plurality of electrical communication lines 356, 358, 360, 362.

The controller 338 also can be referred to as an electronic control unit (ECU) or as a central processing unit. The controller 338 can be configured with hardware and/or software that can permit the controller to operate the brake control system 302 in a hill start assist (HSA) mode.

As will be discussed in further detail with reference to FIGS. 4 and 5, if the controller 338 operates the brake control system 302 in the HSA mode, the controller 338 can manipulate the brake modulator 342 to adjust the fluid pressure at one or more of the second friction members 330L, 330R, 332L, 332R to hold the vehicle 100 stationary if: 1) the vehicle 100 is stopped on an inclined surface, 2) the operator has removed input from the braking input member 312, and 3) the operator has not yet actuated the acceleration input member 314. Further, the controller 338 can control the brake modulator to vary the fluid pressure release rate applied to the second friction members 330L, 330R, 332L, 332R based on the acceleration input provided by the vehicle operator via the acceleration input member 314.

The electrical communication lines 356, 358, 360, 362 can connect the controller 338 to the switch 340, the position sensors 348, 350, and the brake modulator 342 in any appropriate manner. Electrical communication can be either one-way communication or two-way communication, and can be networked or not networked.

The switch 340 can be configured to permit the operator of the vehicle 100 to at least selectively activate the HSA mode of the brake control system 302. The switch 340 can have any configuration that enables transmission of the operator's activation request to the controller 338. In an exemplary embodiment, the switch 340 can include hardware and/or software to perform the assigned task(s). The signal transmitted by the switch 340 can include data indicative of an ON position of the switch 340 and/or an OFF position of the switch. In an alternative embodiment, the signal can include data indicative of contact of the switch 340 by the operator.

The brake modulator 342 can include at least one fluid circuit component that can permit the brake modulator 342 to selectively and independently vary the fluid pressure in each of the communication lines 334L, 334R, 336L, 336R. The brake modulator 342 can include at least one regulator valve. The regulator valve can be in fluid communication with the communication lines 334L, 334R, 336L, 336R. The regulator valve can define an open position and a closed position. If the regulator valve is in the open position, the fluid pressure in the communication lines 334L, 334R, 336L, 336R and at the second friction members 330L, 330R, 332L, 332R can be released so that the second friction members 330L, 330R, 332L, 332R can be disengaged from the first friction members 326L, 326R, 328L, 328R. If the regulator valve is in the closed position, the fluid pressure in the communication lines 334L, 334R, 336L, 336R and at the second friction members 330L, 330R, 332L, 332R can be maintained at the pressure set by the master cylinder 324 or by the brake modulator 342. The regulator valve can be positioned in any position between the closed position and the opened position in order to vary the rate at which fluid pressure can be released in the communication lines 334L, 334R, 336L, 336R and at the second friction members 330L, 330R, 332L, 332R.

The position sensors 348, 350 can include hardware and/or software to perform the assigned task(s). The position sensors 348, 350 can be configured as smart sensors, such that the position sensors 348, 350 store, process, and/or manipulate the raw data that they collect prior to transmission to the controller 338. Alternatively, the position sensors 348, 350 can be configured as simple sensors that pass the raw data directly to the controller 338 without any manipulation of the raw data. The position sensors 348, 350 can be configured to send data to the controller 338, with or without a prompt from the controller 338.

The power source assembly 104 can be coupled to at least one of the wheels 106L, 106R, 108L, 108R in any appropriate manner to propel the vehicle 100. In an exemplary embodiment, the power source assembly 304 can be coupled to all of the wheels 106L, 106R, 108L, 108R. The vehicle 100 can include a pair of front driveshafts 364L, 364R, rear driveshaft 366, propeller shaft 368, bevel gear 370, pinion gear 372 and front differential assembly 374. The power source assembly 104 can be directly or indirectly coupled to the driveshafts 364L, 364R, 366, the driveshafts 364L, 364R can be directly or indirectly coupled to a respective one of the front wheels 106L, 106R, and the rear driveshaft 366 can be directly or indirectly coupled to each of the rear wheels 108L, 108R in any appropriate manner that permits the transfer of torque between the power source assembly 104, the driveshafts 364L, 364R, 366, and the wheels 106L, 106R, 108L, 108R.

The brake position sensor 348 can be configured to output data indicative of the position of the braking input member 312.

The acceleration input member 314 can be in communication with the power source assembly 104 and the brake control system 302. This communication can be performed using various technologies, including mechanical, electrical, or electro-mechanical technologies. The acceleration input member 314 can transmit an input from the operator of the vehicle 100 to the power source assembly 104 for the purpose of regulating the drive output of the power source assembly 104 that can be applied to the wheels 106L, 106R, 108L, 108R.

If the power source assembly 104 is configured as an internal combustion engine, the acceleration input member 314 can be configured as a throttle valve positioned in the intake passage of the internal combustion system. In particular, the throttle valve can be configured as a butterfly valve that is rotatably supported in the intake passage such that the butterfly valve can selective open, close and partially open/close the intake passage. The acceleration position sensor 348 can be configured to output data indicative of the rotational position (in degrees) of the throttle valve.

In another exemplary embodiment, the acceleration input member 314 can be configured as a movable pedal. The movable pedal can be electrically or mechanically coupled to the throttle valve, if the power source assembly includes an internal combustion engine. The accelerator position sensor 348 can be configured to output data indicative of the position of the movable pedal.

The acceleration input member 314 can be biased toward an accelerator released position, and can be displaced away from the accelerator released position by the vehicle operator. If the acceleration input member 314 is in the released position, then the output of the power source assembly 104 can be an idle output that can be insufficient to propel the vehicle 100, or at most, sufficient to propel the vehicle 100 at a relatively slow speed. If the operator displaces the acceleration input member 314 away from the released position, then the acceleration input member 314 can transmit an input to the power source assembly 104 to cause the power source assembly 104 to propel the vehicle 100. If the power source assembly 104 includes an internal combustion engine, the accelerator released position can correspond to the closed position of the throttle valve.

III. Exemplary Switch

Figure 3:
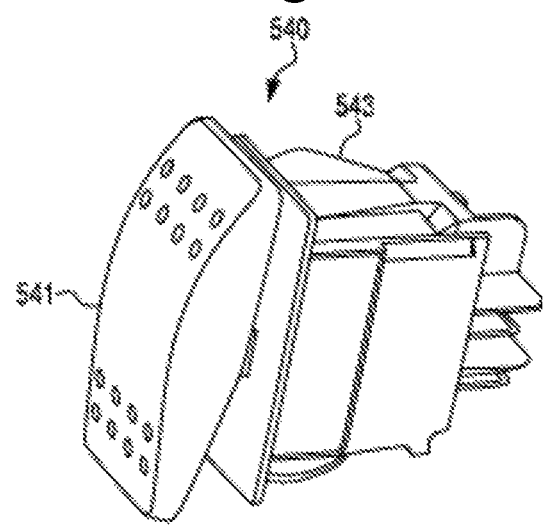
FIG. 3 is a perspective view of an exemplary switch usable with the brake control operations in accordance with the disclosed subject matter.

FIG. 3 is a perspective view of an exemplary embodiment of a switch 540. The switch 540 can include an actuation member 541 and a base member 543. The actuation member 541 can be mounted to the base member 543 so as to be manually movable between an ON position and an OFF position. The base member 543 can be in electrical communication with the controller of the brake control system, and be configured to transmit a signal indicative of the position of the actuation member 541.

The switch 540 can be configured such that, when the actuation member 541 is in the OFF position, the switch 540 can either affirmatively send an OFF signal to the controller 338, or the switch 540 can send no signal to the controller. In either case, the controller 338 operates accordingly as disclosed above. The switch 540 can also be configured such that, when the actuation member 541 is in the ON position, the switch 540 can send an ON signal to the controller 338. Also, in some applications, a second transmission of the ON signal deactivates the HSA mode.

Embodiments are intended to include or otherwise cover any switch configuration that performs the above operations. In many embodiments, the actuation member 541 is configured to be biased toward the OFF position, so that the switch only issues the ON signal if the vehicle operator continues to apply pressure for a predetermined period, such as approximately 0.5 seconds. The switch 540 of some of these embodiments is configured to be a momentary switch, i.e., a switch wherein pressure temporarily actuates the ON position and the switch automatically returns to the OFF position in the absence of pressure. This biasing can be performed using any known, related art, or later developed apparatus, including but not limited to various types of springs.

Some of the switch embodiments disclosed above include or otherwise involve mechanical or electro-mechanical technologies. However, some other switch embodiments entirely or substantially involve electrical technologies, such as touch screen displays, displays where selection is performed via a mouse, etc.

IV. Exemplary Brake Control Operations

Figure 4:
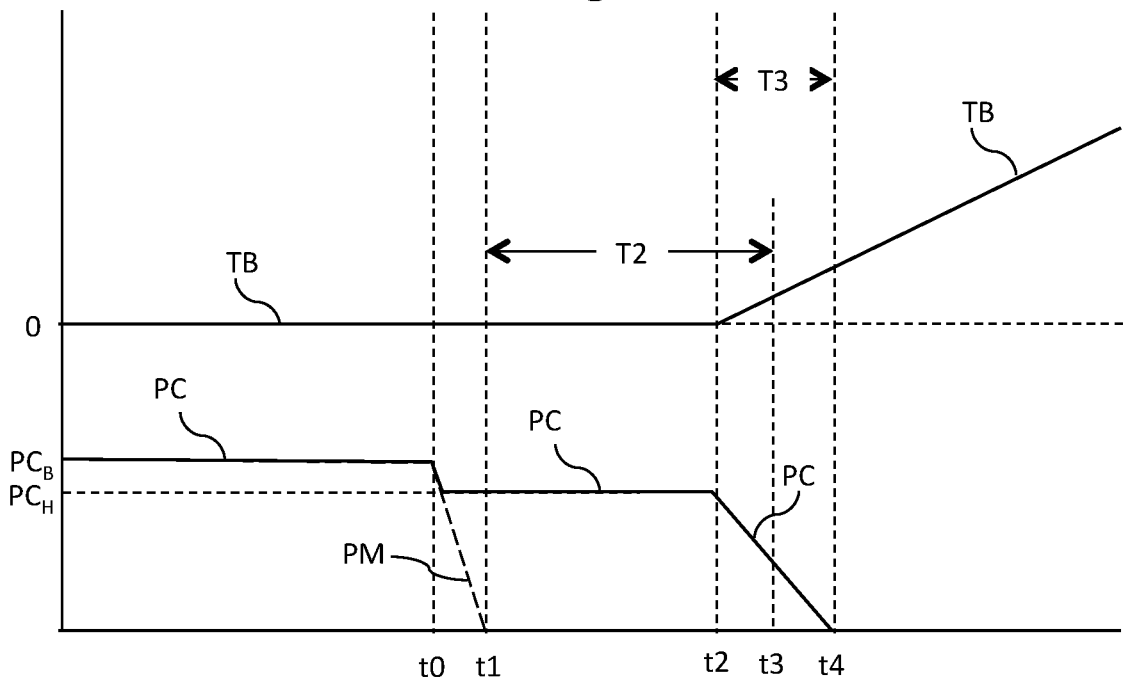
FIG. 4 is a graph illustrating an exemplary throttle position and an exemplary brake pressure release rate in accordance with the disclosed subject matter.

FIG. 4 is a graph of throttle position TB and master cylinder fluid pressure PC during an exemplary period of time during which the vehicle 100 is initially stationary on an inclined surface, and then transitions to travel along the inclined surface, which travel can be up or down the inclined surface. During this exemplary time period, the operator of the vehicle 10 manually actuates the braking input member 312 into one of the plurality of actuation positions until an initial time t0 so that the vehicle 100 remains stationary. The actuation position of the braking input member 312 can cause the fluid pressure PC in the master cylinder 324 to have a value that corresponds to a braking pressure $PC_B$.

While the operator maintains the braking input member 312 in one of the plurality of actuation positions, the acceleration input member 314 remains in the released position, as indicated by the value "0" in the plot of throttle position TB FIG. 4.

At the initial time t0, the operator of the vehicle 100 releases the braking input member 312 and the braking input member 312 returns to its released position. There can be a delay before the operator actuates the acceleration input member 314 after releasing the braking input member 312. Further, there can be a delay between actuation of the acceleration input member 314 and propulsion of the vehicle 100 by the power source assembly 104 due to the inertia of the vehicle and the power source assembly 104, and take-up by any clutch(es) that might be associated with the power source assembly 104. As a result, a vehicle 100 on an inclined surface can roll in the downward direction of the inclined surface until the input to the acceleration input member 314 is sufficient to enable the power source assembly 104 to propel the vehicle 100 along the inclined surface. This delay can be exacerbated if each of the braking input member 312 and the acceleration input member 314 are configured as or otherwise include a movable pedal that is configured to be manually actuated by the operator's foot. For example, if the operator uses the same foot to actuate each of the input members 312, 314, then neither input member 312, 314 receives input from the operator during the delay time interval from the initial time t0 to the acceleration start time as the operator's foot moves from the pedal associated with the braking input member to the pedal associated with the acceleration input member.

If the operator does not activate the HSA mode via the switch 340 before the operator releases the braking input member 312, the fluid pressure PC in the master cylinder 324 and at the second friction members 330L, 330R, 332L, 332R will decrease from the braking pressure $PC_B$ to a value of "0," as indicated by the dashed line PM of FIG. 4. As a result, the delay between the operator's release of the braking input member 312 and propulsion of the vehicle 100 can permit the vehicle 100 to travel down the inclined surface.

If the operator has activated the HSA mode via the switch 340, the controller 338 can send a signal to the brake modulator 342 to maintain the fluid pressure PC at the second friction members 330L, 330R, 332L, 332R at a HSA mode pressure PCH that can be equal to the braking pressure PCB previously requested by the operator, or at least equal to a pressure value that can maintain the vehicle 100 stationary on the inclined surface. Thus, the brake control system 302 can hold the vehicle 100 stationary on the inclined surface until the power source assembly 104 can propel the vehicle 100 along the inclined surface.

The controller 338 can be configured to continue sending the signal to the brake modulator 342 for a predetermined HSA time period T2 that can begin at an HSA start time t1 and ends at a third time t3, where t1 and t3 are subsequent to the initial time t0. The HSA time period T2 can be set to any appropriate value, such as but not limited to a value that can accommodate a reasonable delay between the release of the braking input member 312 and propulsion of the vehicle 100 by the power source assembly 104.

The controller 338 can receive position data from the accelerator position sensor 350. If the operator manually actuates the acceleration input member 314 within the HSA time period T2, then the controller 338 can send a signal to the brake modulator 342 to release the HSA mode pressure PCH at a predetermined rate depicted by the slope of the of the plot of fluid pressure PC between the acceleration start time t2 and the HSA end time t3. As a result, the fluid pressure at the second friction members 330L, 330R, 332L, 332R can be released at the predetermined rate over a predetermined release time period T3. That is, the braking force applied to the wheels 106L, 106R, 108L, 108R can be released in concert with the propulsion force applied to at least one of the wheels 106L, 106R, 108L, 108R so that the vehicle 100 can be prevented from traveling in the downward direction of the inclined surface, or at least limited in the distance of such travel without further intervention by the operator of the vehicle 100.

Figure 5:
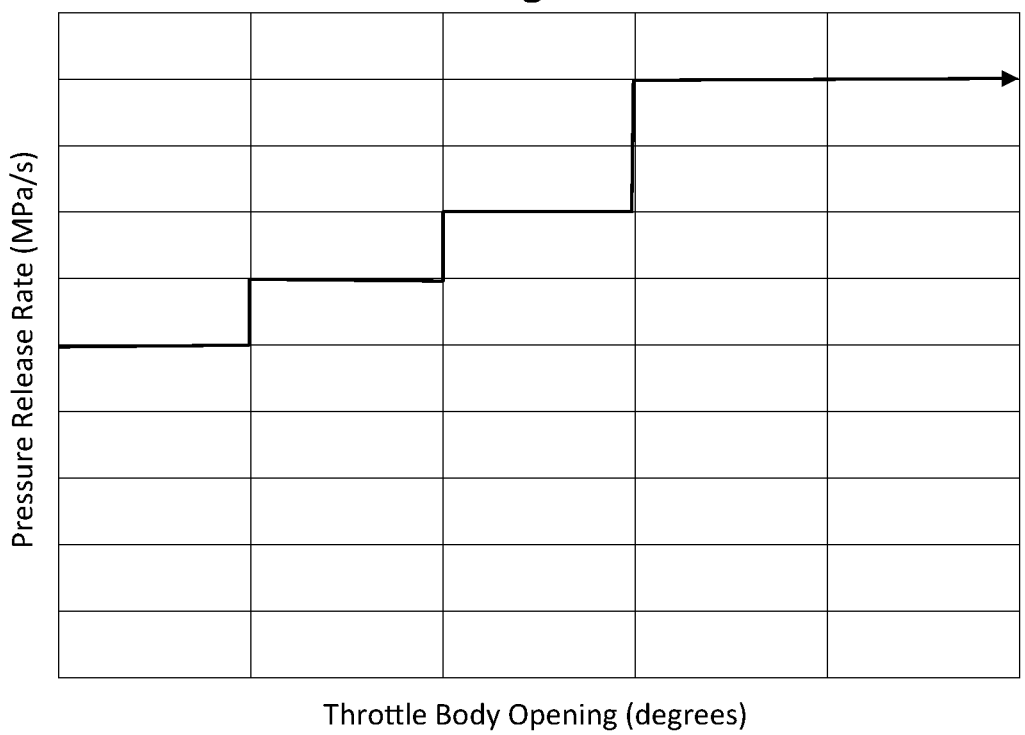
FIG. 5 is an exemplary graph of pressure release rate versus throttle body opening in accordance with the disclosed subject matter.

FIG. 5 illustrates a relationship between the HSA mode pressure release rate and a throttle body opening. The throttle body opening can be representative of the position of the acceleration input member 314. For example, if the power source assembly 104 includes an internal combustion engine and the acceleration input member 314 is configured as a throttle valve, then the throttle body opening can be indicative of the angular position (in degrees) of the throttle valve. In another example, if the acceleration input member 314 is configured as a movable pedal, the throttle body opening can correspond to a pedal position and can be indicative of the position (in angular or linear units) of the movable pedal.

Irrespective of how the acceleration input member 314 is configured, FIG. 5 illustrates that the relationship between the position of the acceleration input member 314 and the pressure release rate is a proportional relationship. That is, the pressure release rate is proportional to the displacement of the acceleration input member 314 caused by the operator. For example, the pressure release rate can increase as the acceleration input member moves toward the fully opened position. Further, the pressure release rate can decrease as the acceleration input member moves toward the fully closed position. Thus, the HSA mode can effectively respond to the severity of the inclined surface as well as to the operator's request for acceleration of the vehicle 100.

FIG. 5 illustrates a plurality of pressure release rates. Further, each pressure release rate can correspond to a respective plurality of throttle body opening values (aka, positions of the acceleration input member 314). That is, FIG. 5 depicts the proportional relationship between pressure release rate and acceleration input member position with a step function. However, exemplary embodiments are intended to include any appropriate relationship between pressure release rate and acceleration input member position, such as but not limited to a linear relationship, an exponential relationship, etc.

As indicated by FIG. 4, the controller 338 can include, or can be in communication with, a timer that determines an amount of time that elapses subsequent to movement of the brake input member into the released state. The controller 338 can send a signal to the start the timer if the controller 338 receives a signal from the brake position sensor 348 that indicates that the braking input member 312 is in the released position. The controller 338 can be configured to compare the time elapsed to a predetermined time threshold (i.e., the HSA time period T2). If the controller 338 determines that the HSA time period T2 has elapsed, the controller 338 can send a signal to the brake modulator 342 to release the pressure at the second friction members 330L, 330R, 332L, 332R, thereby ceasing operation in the HSA mode.

The controller 338 can be configured to select any one of the plurality of pressure release rates when terminating the HSA mode after the HSA time period T2 has elapsed. For example, the controller 338 can be configured to select the pressure release rate that has the smallest value. Exemplary embodiments are intended to include a controller 338 that is configured to select an appropriate one of the pressure release rates based on the inclination of the vehicle 100, where the inclination can be derived from any appropriate sensor such as but not limited to an acceleration sensor, an inclinometer, etc.

Accordingly, the brake control system 302 can include a HSA mode that can permit the operator of the vehicle 100 to initiate a smooth transition from stationary state on an inclined surface into a traveling state in which the power source assembly 104 can propel the vehicle 100 in the upward direction of the inclined surface.

V. Basic Power Source Components

The power source assembly 104 can be an internal combustion engine, an electric motor, or a hybrid of an internal combustion engine and an electric motor. The power source, which is configured as an internal combustion engine or a hybrid power source, can have the engine output axis oriented in the longitudinal direction L or in the traverse direction T of the vehicle 100. The engine can be mounted forward of the front axles, rearward of the rear axles, or intermediate the front and rear axles. In the exemplary embodiment of FIGS. 1 and 2, the power source assembly is configured as a longitudinally-oriented rear-mounted internal combustion engine selectively driving a transmission.

The transmission can be an automatic transmission, a manual transmission, or a semi-automatic transmission. The transmission can include an input shaft, an output shaft, and a speed ratio assembly. A coupling can connect the engine output shaft to the input shaft. The coupling can permit selective engagement/disengagement of the input shaft with the engine output shaft, or at least relative rotation of the engine output shaft with respect to the input shaft, in any appropriate manner known. Exemplary couplings can include, but are not limited to, a friction disc clutch and a torque converter.

The speed ratio assembly can connect the input shaft to the transmission output shaft, such that the transmission output shaft can rotate at variable speeds relative to the input shaft. The speed ratio assembly can be a stepped speed ratio assembly or a continuously variable speed ratio assembly. The transmission input shaft can be referred to as a mainshaft.

A gear shift lever (or switch) can be connected to the transmission, electrically, mechanically, or elector-mechanically, in any manner known in the art such that actuation of the gear shift lever by the operator can effect a shift from one gear ratio to another gear ratio within the transmission. The gear shift lever can be a mechanical lever or an electrical switch, as is known in the art. The gear shift lever can be mounted in any one of a plurality of different locations within the vehicle, including but not limited to, on a center console, on the steering column, on the steering wheel, and on the instrument panel.

VI. Alternative Embodiments

While certain embodiments of the invention are described above, and FIGS. 1-5 disclose the best mode for practicing the various inventive aspects, it should be understood that the invention can be embodied and configured in many different ways without departing from the spirit and scope of the invention.

For example, embodiments are disclosed above in the context of an off-road vehicle shown in FIGS. 1 and 2. However, embodiments are intended to include or otherwise cover any type of vehicle that includes the brake control system disclosed above. For example, the vehicle can include any number of wheels such as but not limited to three wheels, four wheels, six wheels, or ten wheels. Exemplary embodiments of the vehicle can include a tracked drive arrangement as used on earth-moving vehicles or snow mobiles. Exemplary embodiments are further intended to cover omission of at least one wheel, such as but not limited to a ski as a replacement. However, the above alternative embodiments are merely provided for exemplary purposes, and as indicated above, embodiments are intended to cover any type of vehicular brake control system.

Exemplary embodiments are intended to include or otherwise cover any number of seats, including a singe seat centrally mounted between the front and rear wheels. The single seat can be mounted above the power source assembly, which also can be centrally mounted between the front and rear wheels.

Exemplary embodiments are intended to include one or more of the acceleration input member and the braking input member configured for actuation by an operator's hand instead of by the operator's foot. For example, exemplary embodiments are intended to include or otherwise cover an acceleration input member configured as a twist grip rotatably mounted on a handlebar. In another example, exemplary embodiments are intended to include or otherwise cover an acceleration input member and/or a braking input member configured as a lever pivotally mounted on a handlebar.

Exemplary embodiments are intended to include or otherwise cover any type of switch that can permit the vehicle operator to at least selectively activate the brake control system. In other words, exemplary embodiments are intended to cover any application of switch that can permit at least selective activation of the brake control system disclosed above.

Exemplary embodiments are also intended to cover any type of actuation of the second friction member that can selectively engage/disengage the second friction member with/from the first friction member, including pneumatic actuation, hydraulic actuation, or electrical actuation. Exemplary embodiments are further intended to cover omission of the master cylinder. Exemplary embodiments are further intended to cover omission of the brake modulator in vehicle brake system that uses a respective electrical actuator to selectively engage/disengage the second friction member with/from the first friction member.

Exemplary embodiments are also intended to cover a brake control system that includes an inclinometer or an accelerometer or other device that can permit the controller to determine the angle of inclination of the vehicle relative to horizontal. The method can include a step to compare the angle of inclination with a threshold angle as a predetermined condition to engage/disengage the hill start assist mode.

Embodiments are also intended to include or otherwise cover methods of using and methods of manufacturing the apparatus disclosed above. The methods of manufacturing include or otherwise cover processors and computer programs implemented by processors used to design various elements of the apparatus disclosed above.

While the subject matter has been described in detail with reference to exemplary embodiments thereof, it will be apparent to one skilled in the art that various changes can be made, and equivalents employed, without departing from the scope of the invention. All related art references discussed in the above Description of the Related Art section are hereby incorporated by reference in their entirety.

What is claimed is:

1. A brake control system for enhancing performance of a vehicle traveling along an inclined surface, the vehicle including a vehicle braking system that includes friction members for reducing or limiting vehicle speed based on application of fluid pressure, the vehicle also including a power source assembly and a manually operated acceleration input member movable between an actuated position that controls the power source assembly to propel the vehicle along the inclined surface and a released position that corresponds to an idle output of the power source assembly, the brake control system comprising:
   a manually actuated braking input member movable between an actuated position that reduces or limits vehicle speed and a released position that does not reduce or limit vehicle speed;
   a brake modulator that is controllable to manipulate the vehicle braking system to maintain the vehicle in a stationary position by maintaining an amount of fluid pressure supplied to the friction members if the braking input member is in the released position; and
   a controller that controls the brake modulator to selectively operate in a hill start assist mode to adjust fluid pressure at the friction members to hold the vehicle stationary after the vehicle is initially stopped while traveling along the inclined surface, the vehicle being held stationary until the acceleration input member is actuated to control the power source assembly to propel the vehicle, the controller is configured to control the brake modulator by,
      determining when the acceleration input member is moved from the released position to the actuated position,
      comparing the actuated position to a range of possible actuated positions of the acceleration input member that spans from the released position to a fully opened position, the range of possible actuated positions is divided into a plurality of consecutive sub-ranges, each of the sub-ranges includes a respective plurality of the possible actuated positions, where each of the sub-ranges has a single corresponding pressure release rate,
      selecting the pressure release rate that corresponds to the sub-range that includes a possible actuated position that matches the actuated position, and
      sending a signal to the brake modulator to release fluid pressure at the friction members in accordance with the pressure release rate selected by the controller, wherein
   the plurality of sub-ranges includes a first sub-range that has a first single corresponding pressure release rate that is a first constant value, a second sub-range that is consecutive to the first sub-range and has a second single corresponding pressure release rate that is a second constant value, a third sub-range that is consecutive to the second sub-range and has a third single corresponding pressure release rate that is a third constant value, and a fourth sub-range that is consecutive to the third sub-range and has a fourth single corresponding pressure release rate that is a fourth constant value, and
   the second single corresponding pressure release rate is greater than the first single corresponding pressure release rate by a first predetermined amount, the third single corresponding pressure release rate is greater than the second single corresponding pressure release rate by the first predetermined amount, and the fourth single corresponding pressure release rate is greater than the third single corresponding pressure release rate by a second predetermined amount that is greater than the first predetermined amount.

2. The brake control system of claim 1, wherein the controller controls the brake modulator to release fluid pressure at the friction members such that the pressure release rate increases as the acceleration input member moves toward the fully opened position.

3. The brake control system of claim 1, further comprising an accelerator position sensor in electrical communication with the controller and configured to output data indicative of the current position of the acceleration input member.

4. The brake control system of claim 3, wherein the power source assembly includes an internal combustion engine, the acceleration input member includes a throttle valve, and the accelerator position sensor is configured to output data indicative of the angular position of the throttle valve.

5. The brake control system of claim 1, further comprising a single manually operated switch configured to selectively instruct the controller to activate and deactivate the hill start assist mode.

6. The brake control system of claim 5, wherein the switch is configured such that manual application of pressure for a period substantially equal to or exceeding 0.5 seconds actuates the switch in an activate position.

7. The brake control system of claim 1, wherein the vehicle braking system includes a brake position sensor that senses the position of the braking input member, and the controller controlling the brake modulator to operate in the hill start assist mode if the brake position sensor senses that the braking input member is in the released state.

8. The brake control system of claim 1, further including a timer that determines an amount of time that elapses subsequent to movement of the braking input member into the released state, the controller comparing the time elapsed to a predetermined time threshold, and controlling the brake modulator to cease operating in the hill start assist mode if the elapsed time exceeds the predetermined time threshold.

9. A vehicle comprising:
a power source assembly;
a manually operated acceleration input member movable between an actuated position that controls the power source assembly to propel the vehicle along an inclined surface and a released position that corresponds to an idle output of the power source assembly; and
a vehicle braking system that includes friction members for reducing or limiting vehicle speed based on application of fluid pressure; and
a brake control system for enhancing performance of a vehicle traveling along an inclined surface, the brake control system including:
    a manually actuated braking input member being movable between an actuated position that reduces or limits vehicle speed and a released position that does not reduce or limit vehicle speed;
    a brake modulator that is controllable to manipulate the vehicle braking system to maintain the vehicle in a stationary position by maintaining an amount of fluid pressure supplied to the friction members if the braking input member is in the released position; and
    a controller that controls the brake modulator to selectively operate in a hill start assist system mode to adjust fluid pressure at the friction members to hold the vehicle stationary after the vehicle is initially stopped while traveling along the inclined surface, the vehicle being held stationary until the acceleration input member is actuated to control the power source to propel the vehicle, the controller is configured to control the brake modulator by,
    determining when the acceleration input member is moved from the released position to the actuated position,
    comparing the actuated position to a range of possible actuated positions of the acceleration input member that spans from the released position to a fully opened position, the range of possible actuated positions is divided into a plurality of consecutive sub-ranges, each of the sub-ranges includes a respective plurality of the possible actuated positions, where each of the sub-ranges has a single corresponding pressure release rate,
    selecting the pressure release rate that corresponds to the sub-range that includes a possible actuated position that matches the actuated position, and
    sending a signal to the brake modulator to release fluid pressure at the friction members in accordance with the pressure release rate selected by the controller, wherein
the plurality of sub-ranges includes a first sub-range that has a first single corresponding pressure release rate that is a first constant value, a second sub-range that is consecutive to the first sub-range and has a second single corresponding pressure release rate that is a second constant value, a third sub-range that is consecutive to the second sub-range and has a third single corresponding pressure release rate that is a third constant value, and a fourth sub-range that is consecutive to the third sub-range and has a fourth single corresponding pressure release rate that is a fourth constant value, and
the second single corresponding pressure release rate is greater than the first single corresponding pressure release rate by a first predetermined amount, the third single corresponding pressure release rate is greater than the second single corresponding pressure release rate by the first predetermined amount, and the fourth single corresponding pressure release rate is greater than the third single corresponding pressure release rate by a second predetermined amount that is greater than the first predetermined amount.

10. The vehicle of claim 9, wherein the controller controls the brake modulator to release fluid pressure at the friction members such that the pressure release rate increases as the acceleration input member moves toward the fully opened position.

11. The vehicle of claim 9, further comprising an accelerator position sensor in electrical communication with the controller and configured to output data indicative of the current position of the acceleration input member.

12. The vehicle of claim 11, wherein the power source assembly includes an internal combustion engine, the acceleration input member includes a throttle valve, and the accelerator position sensor is configured to output data indicative of the angular position of the throttle valve.

13. The vehicle of claim 9, further comprising a single manually operated switch configured to selectively instruct the controller to activate and deactivate the hill start assist system mode.

14. The vehicle of claim 9, wherein the vehicle braking system includes a brake position sensor that senses the position of the braking input member, the controller controlling the brake modulator to operate in the hill start assist system mode if the brake position sensor senses that the braking input member is in the released state.

15. The vehicle of claim 14, further including a timer that determines an amount of time that elapses subsequent to movement of the brake input member into the released state, the controller comparing the time elapsed to a predetermined time threshold, and controlling the brake modulator to cease operating in the hill start assist system mode if the elapsed time exceeds the predetermined time threshold.

16. A method of enhancing performance of a vehicle traveling along an inclined surface, the vehicle including a vehicle braking system that includes friction members for reducing or limiting vehicle speed based on application of fluid pressure, a brake modulator that is controllable to manipulate the vehicle braking system to reduce or limit the vehicle speed by controlling an amount of fluid pressure supplied to the friction members, and a manually actuated braking input member being movable between an actuated position that reduces or limits vehicle speed and a released position that does not reduce or limit vehicle speed, the vehicle including a power source assembly and a manually operated acceleration input member movable between an actuated position that controls the power source assembly to propel the vehicle along the inclined surface and a released position that corresponds to an idle output of the power source assembly, the method comprising:
    detecting the released position of the braking input member;
    selectively instructing activation and deactivation of a hill start assist system mode;
    controlling the brake modulator to manipulate the vehicle braking system to selectively operate in a hill start assist mode by adjusting fluid pressure at the friction members to hold the vehicle stationary after the vehicle is initially stopped while traveling along the inclined surface, the vehicle being held stationary until the acceleration input member is actuated to control the power source assembly to propel the vehicle,
    controlling the brake modulator further including, determining when the acceleration input member is moved from the released position to the actuated position, comparing the actuated position to a range of possible actuated positions of the acceleration input member that spans from the released position to a fully opened position, the range of possible actuated positions being divided into a plurality of consecutive sub-ranges, each of the sub-ranges including a respective plurality of the possible actuated positions, where each of the sub-ranges has a single corresponding pressure release rate, selecting the pressure release rate that corresponds to the sub-range that includes a possible actuated position that matches the actuated position, and sending a signal to the brake modulator to release fluid pressure at the friction members in accordance with the pressure release rate selected by the controller, wherein the plurality of sub-ranges includes a first sub-range that has a first single corresponding pressure release rate that is a first constant value, a second sub-range that is consecutive to the first sub-range and has a second single corresponding pressure release rate that is a second constant value, a third sub-range that is consecutive to the second sub-range and has a third single corresponding pressure release rate that is a third constant value, and a fourth sub-range that is consecutive to the third sub-range and has a fourth single corresponding pressure release rate that is a fourth constant value, and the second single corresponding pressure release rate is greater than the first single corresponding pressure release rate by a first predetermined amount, the third single corresponding pressure release rate is greater than the second single corresponding pressure release rate by the first predetermined amount, and the fourth single corresponding pressure release rate is greater than the third single corresponding pressure release rate by a second predetermined amount that is greater than the first predetermined amount.

* * * * *